US007930310B2

(12) United States Patent
Cirulli et al.

(10) Patent No.: US 7,930,310 B2
(45) Date of Patent: Apr. 19, 2011

(54) GLOBAL RESOURCE METHOD AND SYSTEM

(75) Inventors: Susan Bumgardner Cirulli, Simpsonville, SC (US); Mark Kemp, Normalville, PA (US); Gautam Majumdar, Wappingers Falls, NY (US); Russell Emmett Parks, Marlboro, NY (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 11/768,327

(22) Filed: Jun. 26, 2007

(65) Prior Publication Data
US 2009/0006355 A1 Jan. 1, 2009

(51) Int. Cl.
*G06F 7/00* (2006.01)
(52) U.S. Cl. .................. 707/758; 700/736; 715/968
(58) Field of Classification Search .......... 707/5, 758, 707/736; 705/9, 11, 37, 30, 320, 321; 718/104; 715/968
See application file for complete search history.

(56) References Cited

U.S. PATENT DOCUMENTS

| 4,255,872 A | 3/1981 | Williams, Sr. |
| 6,311,164 B1 | 10/2001 | Ogden |
| 6,544,172 B2 | 4/2003 | Toeppen-Sprigg |
| 6,662,194 B1 | 12/2003 | Joao |
| 6,718,340 B1 | 4/2004 | Hartman et al. |
| 7,043,443 B1 | 5/2006 | Firestone |
| 7,080,057 B2 | 7/2006 | Scarborough et al. |
| 7,801,785 B2 * | 9/2010 | Kretzschmar et al. .......... 705/35 |
| 2001/0042038 A1 * | 11/2001 | Phatak ............................. 705/37 |
| 2004/0267606 A1 * | 12/2004 | Brishke et al. .................. 705/11 |
| 2005/0010467 A1 * | 1/2005 | Dietz et al. ........................ 705/9 |
| 2008/0244605 A1 * | 10/2008 | Bennington et al. .......... 718/104 |

* cited by examiner

*Primary Examiner* — Debbie Le
*Assistant Examiner* — Bao G Tran
(74) *Attorney, Agent, or Firm* — Schmeiser, Olsen & Watts; William E. Schiesser (57) ABSTRACT

A method and system for selecting a candidate. The method includes associating by a computing system, groups of suppliers with geographical areas. The computing system receives a selection of a first skill from a requester. The requester is located within a first geographical area. The computing system receives geographical area specification data associated with the first skill. The computing system receives a selection of a first work location associated with the first skill. The computing system receives a selection of a group of suppliers comprising a first supplier associated with the geographical area specification data. The computing system generates a service request document comprising the selection of said first skill associated with a candidate. The computing system transmits the service request document to the group of suppliers.

40 Claims, 3 Drawing Sheets

GLOBAL RESOURCE METHOD AND SYSTEM

FIELD OF THE INVENTION

The present invention relates to a method and associated system for global resource candidate request.

BACKGROUND OF THE INVENTION

Selecting individuals to perform functions within an organization typically comprises an inefficient process with little flexibility. Locating individuals capable of performing the functions typically comprises a lengthy and costly process. Generally, a location for the individuals and a location for performing the functions must be coordinated. Accordingly, there exists a need in the art to overcome the deficiencies and limitations described herein above.

SUMMARY OF THE INVENTION

The present invention provides a global resource method comprising:

receiving, by a computing system from a requester, a command for creating a service request, said computing system comprising a memory device, said memory device comprising a list of skills, a list of suppliers, a list of geographical areas, supplier configuration data, and a list of work locations;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

presenting, by said computing system for said requester, a first group of suppliers of said list of suppliers, said first group of suppliers associated with said supplier configuration data;

receiving, by said computing system from said requester, a selection of a second group of suppliers of said first group of suppliers, said second group comprising a comprising a first supplier associated with said geographical area specification data;

generating, by said computing system, a service request document, said service request document comprising said selection of said first skill;

transmitting, by said computing system, said service request document to said second group of suppliers;

receiving, by said computing system from said first supplier in response to said service request document, a list of candidates, said list of candidates comprising candidates associated with said first skill and candidate rates data associated each of said candidates, said candidate rates data normalized to a common currency with respect to all areas associated with said geographical area specification data.

The present invention provides a computing system comprising a processor coupled to a computer-readable memory unit, said memory unit comprising instructions that when executed by the processor implement a global resource method, said method comprising:

receiving, by said computing system from a requester, a command for creating a service request, said memory unit comprising a list of skills, a list of suppliers, a list of geographical areas, supplier configuration data, and a list of work locations;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

presenting, by said computing system for said requester, a first group of suppliers of said list of suppliers, said first group of suppliers associated with said supplier configuration data;

receiving, by said computing system from said requester, a selection of a second group of suppliers of said first group of suppliers, said second group comprising a comprising a first supplier associated with said geographical area specification data;

generating, by said computing system, a service request document, said service request document comprising said selection of said first skill;

transmitting, by said computing system, said service request document to said second group of suppliers;

receiving, by said computing system from said first supplier in response to said service request document, a list of candidates, said list of candidates comprising candidates associated with said first skill and candidate rates data associated each of said candidates, said candidate rates data normalized to a common currency with respect to all areas associated with said geographical area specification data.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a global resource method, said method comprising:

receiving, by said computing system from a requester, a command for creating a candidate request, said computing system comprising a memory unit, said memory unit comprising a list of skills, a list of suppliers, a list of geographical areas, supplier configuration data, and a list of work locations;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

presenting, by said computing system for said requester, a first group of suppliers of said list of suppliers, said first group of suppliers associated with said supplier configuration data;

receiving, by said computing system from said requester, a selection of a second group of suppliers of said first group of suppliers, said second group comprising a comprising a first supplier associated with said geographical area specification data;

generating, by said computing system, a service request document, said service request document comprising said selection of said first skill;

transmitting, by said computing system, said service request document to said second group of suppliers;

receiving, by said computing system from said first supplier in response to said service request document, a list of candidates, said list of candidates comprising candidates associated with said first skill and candidate rates data associated each of said candidates, said candidate rates data normalized to a common currency with respect to all areas associated with said geographical area specification data.

The present invention provides a computer program product, comprising a computer usable medium comprising a computer readable program code embodied therein, said computer readable program code adapted to implement a global resource method within a computing system, said method comprising:

receiving, by said computing system from a requester, a command for creating a candidate request, said computer usable medium comprising a list of skills, a list of suppliers, a list of geographical areas, supplier configuration data, and a list of work locations;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

presenting, by said computing system for said requester, a first group of suppliers of said list of suppliers, said first group of suppliers associated with said supplier configuration data;

receiving, by said computing system from said requester, a selection of a second group of suppliers of said first group of suppliers, said second group comprising a comprising a first supplier associated with said geographical area specification data;

generating, by said computing system, a service request document, said service request document comprising said selection of said first skill;

transmitting, by said computing system, said service request document to said second group of suppliers;

receiving, by said computing system from said first supplier in response to said service request document, a list of candidates, said list of candidates comprising candidates associated with said first skill and candidate rates data associated each of said candidates, said candidate rates data normalized to a common currency with respect to all areas associated with said geographical area specification data.

The present invention advantageously provides a method and associated system capable of selecting individuals to perform functions within an organization.

DETAILED DESCRIPTION OF THE INVENTION

Figure 1:
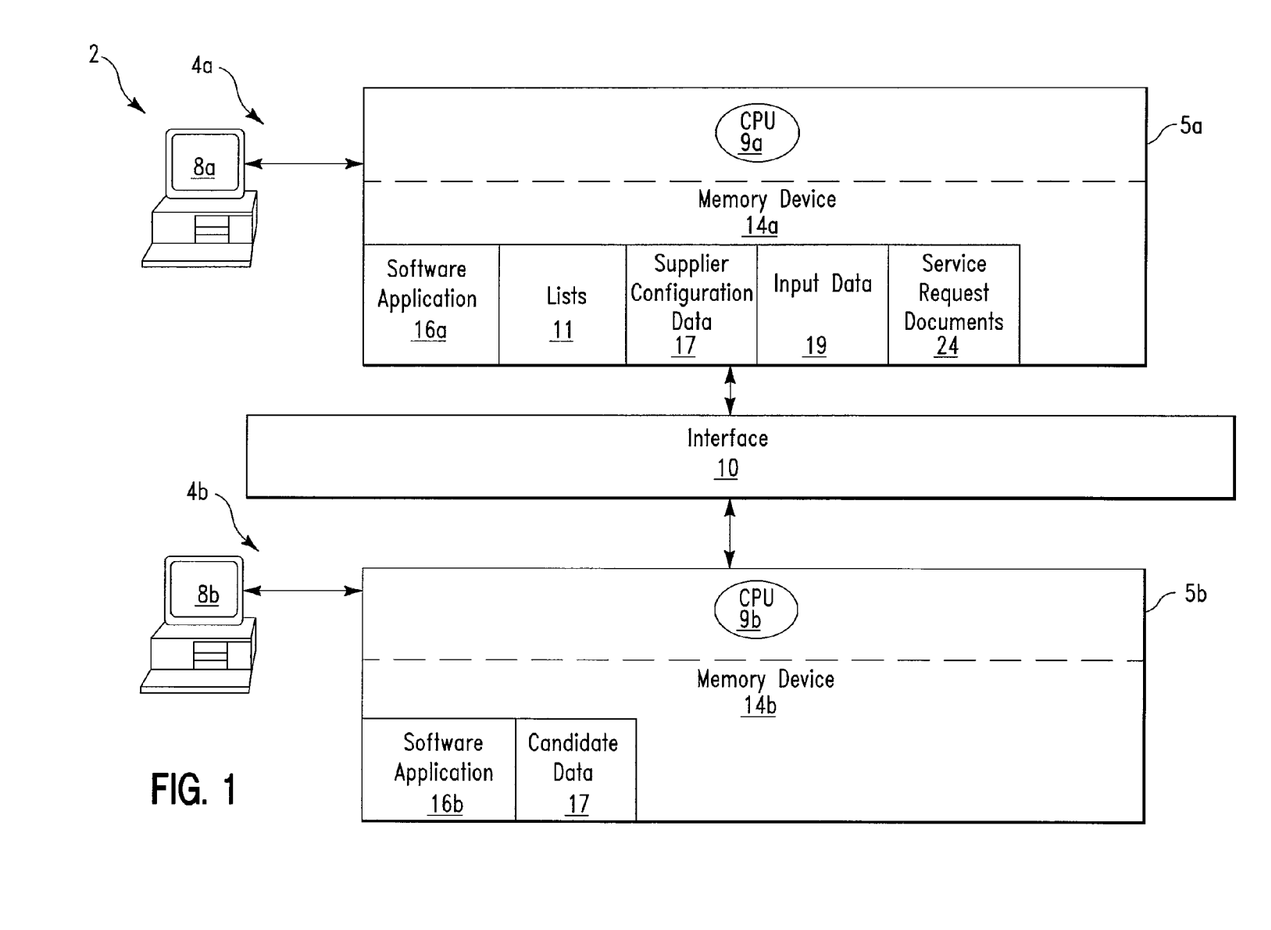
FIG. 1 illustrates a block diagram of a system for generating a global resource candidate request, in accordance with embodiments of the present invention.

FIG. 1 illustrates a block diagram of a system 2 for generating a global resource service request, in accordance with embodiments of the present invention. A global resource service request is defined herein as a request (i.e., requested by a requester from a requesting company) for contract services (e.g., job functions) to be performed by a contractor at a lowest total cost. The contractor is selected from a plurality of eligible candidates provided by a supplier. The contractor may be sourced from any location or country (e.g., globally) regardless of where the need for services is identified. When a project manager needs a contractor resource with a predetermined primary skill which is best satisfied from a low cost country, the candidate request which will fill the need of the project manager is designated as a global resource candidate request. System 2 may be used in any business process to enable a requester to perform the following steps:

1. A requester selects a type of skill for request.
2. The requester determines if a candidate will be obtained from an offshore location (i.e., a different country from the requesting company or work location) or onsite (i.e., a country of the work location). A work location does not have to be in the same country as the requester.
3. The requester may enter any additional candidate information.
4. A global service request document is generated and transmitted to selected suppliers. The suppliers may be offshore or onsite.

A requester is defined herein as a person/people (e.g., users from an entity such as, inter alia, an organization) looking for a resource or contractor (i.e., a person/people procured from a third party supplier with a specific skill(s)) to perform job functions). A resource will perform job functions for a requesting organization. The resource is actually an employee of the supplier and not the requesting company. An offshore candidate request is defined herein as a request for candidate services that may be performed anywhere (i.e. a contractor does not have to be in the local country and may be in a different country, different time zone, etc.). An onsite candidate request is defined herein as a request for services where a contractor will fill an open job position at the requester's home country or the country for which the requester created the request. A service request document comprises a request document generated by a requester and transmitted to a supplier. The service request document comprises a request that is generated in order to obtain contracted technical, administrative, or business service candidates for filling a contractor position. A service request document may comprise one or more line items, each of which indicates a type of skill required as selected from a corporate taxonomy. A work location is defined herein as an actual address where a contractor will actually work. A work location may include, inter alia, a country, a state/region, city, a street address, a postal code, etc.

System 2 comprises a computing system 4a (e.g., a server) connected to a computing system 4b (e.g., a server) through an interface 10. Interface 10 may comprise any type of interface known to a person of ordinary skill in the art including, inter alia, a local area network, (LAN), a wide area network (WAN), the Internet, etc. Computing system 4a comprises a computing apparatus 5a and an interface terminal 8a. Computing system 4b comprises a computing apparatus 5b and an interface terminal 8b. Computing apparatus 5a comprises a CPU 9a and a memory device 14a. Alternatively, memory device 14a may be located external to computing apparatus 5a. Memory device 14a comprises a software application 16a, lists 11, supplier configuration data 17, input data 19, and service request documents 24. Lists 11, supplier configuration data 17, input data 19, and service request documents 24 may be inputted into computing apparatus through interface terminal 8a. Computing apparatus 5b comprises a CPU 9b and a memory device 14b. Alternatively, memory device 14b may be located external to computing apparatus 5b. Memory device 14b comprises a software application 16b and candidate data 17. Candidate data 17 may be inputted into computing apparatus through interface terminal 8b. Candidate data 17 (i.e., comprising lists of candidates for performing specified skills) may be inputted into computing apparatus 5b through interface terminal 8b.

Software application 16a and 16b enables a requester generating a candidate service request to indicate that work (i.e., services performed by a selected candidate) does have to be performed in any specific geographic location (e.g., a specific country). The requester may consider candidates that from any geographical area within the requester's country or outside the requester's country. The requester may then receive various candidates for the request document submitted, by a broad market of potential candidates. This enables an open competition of labor sources and reduced cost to the requester's company. The request documents may be routed to suppliers with multinational support and/or a group of suppliers that represent specific geographic areas of support. The above described process removes any country and geographic boundaries from a candidate selection process. The requester assesses various candidates making a final decision based on a lowest cost and most qualified candidates.

Software application 16a and 16b may be configured to enable the following steps in order to generate a service request document:
1. Computing system 4a receives from a requester, a command for creating a service request document.
2. Computing system 4a associates groups of suppliers from a supplier list of lists 11 with each geographical area (e.g., countries) from a list of geographical areas (i.e., of lists 11).
3. The requester selects (i.e., using computing system 4a) a first skill from a list of skills (i.e., of lists 11).
4. Computing system 4a determines that a first geographical area (i.e., geographical area of the requester) from the list of geographical areas is configured for global resource processing.
5. Computing system 4a receives from the requester, geographical area specification data (i.e., i.e., specifying offshore or onsite) for the first selected skill.
6. The requester selects any contractor work location.
7. Computing system 4a presents for the requester, a first group of suppliers from a list of suppliers. The first group of suppliers is associated with supplier configuration data 17. Supplier configuration data 17 indicates suppliers configured for different geographical areas.
8. The requester selects a second group of suppliers from the first group of suppliers. The second group comprises a comprising a first supplier associated with the geographical area specification data.
9. Computing system 4a generates a service request document comprising the selection of the first skill.
10. Computing system 4a transmits the service request document to the second group of suppliers.
11. Computing system 4a receives from the first supplier in response to the service request document, a list of candidates comprising candidates associated with the first skill. Additionally, candidate rates data associated each of the candidates is received by the requester. The candidate rates data is normalized to a common currency with respect to all areas associated with the geographical area specification data.

The following description illustrates an example of implementation for using system 2 for generating a global resource candidate request.

A requester would like to order a contractor that has the following three qualifications:
1. Java programming skills
2. A Bachelor of Science degree
3. 10 years working experience.

Additionally, the contractor must speak English and Spanish. A project (i.e., that the contractor will work on) will be 6 months in length. The work is for a US corporation based in Pennsylvania, but the work may be performed anywhere worldwide.

A supplier, (Acme Programming agency) has been configured for a work region of "All US" and "ALLWORLDWIDE". Acme Programming agency is located in India. A rate matrix is configured to illustrate that an Acme java programming skill is paid US$60/hour for a US candidate, AUS$75/hr for an Australian candidate, and 250 Rupee/hr for an Indian candidate.

A supplier, "ABC Programming agency" has been configured for work region "ALLWORLDWIDE". A rate matrix is configured to show that an ABC java programming skill is paid US$140/hour for a US candidate and 75 Euro/hr for a German candidate. ABC is located in the US.

A requester in the US creates a global resource skill request #11111 for a java programmer with the above reference experiences and skills for 6 months duration. The requester is then presented with the option of directing the business to:
1. A specific US location if they prefer to have the contractor work on a specific site locally.
2. Specific countries or geographies if the requester requires them to have specific nationalistic backgrounds or prefers them to be in a specific time zone. or
3. A global supply base if the requester is indifferent to the location of the contractor.

The requester indicates that an offshore selection and selects the (3) option, "ALLWORLDWIDE, as the work location. On a supplier selection screen, the supplier sees all suppliers in the application that have been configured as ALLWORLDWIDE. The requester will view "Acme Programming" supplier and "ABC Programming" supplier.

The requester may then select one or more suppliers available on the selection screen to direct a service request document. The requester selects Acme and ABC as the suppliers and transmits a service request document to the suppliers.

Acme and/or ABC review the candidate request submitted by the requester and respond to the request. They may post any candidate(s) who are available and match the requested skill, regardless of their location. Acme elects to offer a candidate from the US and is presented with a pre-negotiated rate of US$60/hr not to be exceeded. For this candidate they offer a candidate from Iowa at US$45/hr. Acme also offers a candidate from India at a rate of 250 Rupee/hr. ABC responds with one candidate from Germany at a rate of 70 Euro/hr. Each of these candidates is submitted to the requester for evaluation. The requester is presented with each of the three candidates. The requester may compare the skill level and experiences for each candidate along with a comparison of resumes. In addition, the requester is presented with each candidate's rate normalized to US dollars to compare the competitiveness of each offer and select the best candidate for his/her needs.

Another requester in the US creates a non-global resource skill request #22222 for a java programmer for 6 months duration. He/she selects "New York City" as the work location. On the supplier selection screen, he/she sees "ABC" supplier, along with any other suppliers that match the country, company, line of business and service type.

On the supplier side, ABC supplier, when responding to request #22222, would post only candidates located in New York City. The requester may select the best candidate from the responses, and the rate provided by ABC programming is US$140/hour as a result of the higher cost of living in New York City versus Iowa.

Figure 2:
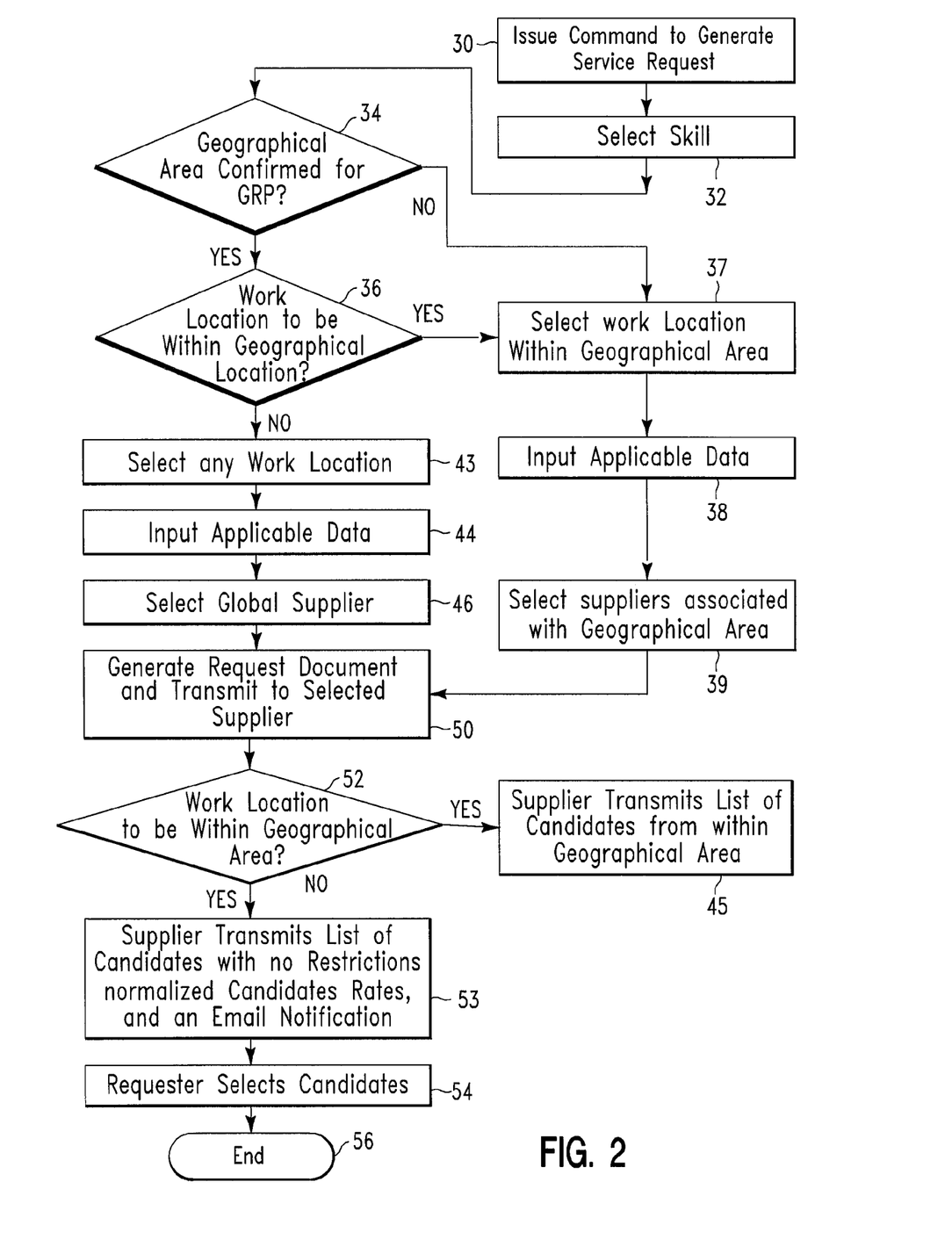
FIG. 2 illustrates a flowchart describing an algorithm used by the system of FIG. 1 for generating a global resource candidate request, in accordance with embodiments of the present invention.

FIG. 2 illustrates a flowchart describing an algorithm used by system 2 of FIG. 1 for generating a global resource candidate request, in accordance with embodiments of the present invention. In step 30, a requester issues a command (e.g., using computing system 4*a* of FIG. 1) to generate a service request document. In step 32, the requester selects a requested skill (e.g., a Java programmer). In step 34, computing system 4*a* determines if the requester's geographical area (e.g., country) is configured for global resource processing. Note that not all geographical area (e.g., country) allow (i.e., are configured for) cross-geographic buying of contractors.

If in step 34, computing system 4*a* determines that the requester's geographical area (e.g., country) is configured for global resource processing, then in step 36 the requester will determine if the selected skill from step 32 (e.g., a Java programmer) be performed within the requester's geographical area (i.e. onsite where the requester is located) or outside the requester's geographical area (i.e., offshore). If in step 36, the requester determines that the selected skill from step 32 (e.g., a Java programmer) will be performed within the requester's geographical area, then in step 37 the requester will select or identify an associated work location within the requester's geographical area. In step 38, the requester will enter any additional information required for the request. For example, the requester may want to identify any citizenship preferences for candidates or potential expenses (known travel expenses, additional software required, etc.) with respect to candidates. In step, 39, the requester will be presented with a list of associated suppliers that the service request document may be routed to. In response, the requester selects suppliers from the list. The supplier list is generated based on a supplier configuration (supplier configuration data 17 of FIG. 1). Supplier configuration may comprise country, company, line of business, work region, and service type. All suppliers that match those criteria are listed, for the requester to select from. In step 50, a service request document comprising the selected skill is generated and transmitted to the suppliers selected in step 39.

If in step 34, computing system 4*a* determines that the requester's geographical area (e.g., country) is not configured for global resource processing, then step 36 is bypassed and steps 37, 38, 39, and 50 are performed as described, supra.

If in step 36, the requester determines that the selected skill from step 32 (e.g., a Java programmer) is not required to be performed within the requester's geographical area, then in step 43 the requester may select a work location of "ALLxxx" (i.e., offshore) to indicate that the work location is tied to the requester's country. There are several variations of "ALLxxx":

1. The requester may select "ALLWORLDWIDE," so that a location of the candidate is immaterial
2. The requester may select "ALLAmericas" (or "ALLEMEA" or "ALLAP" so that a location of the candidate would be located in the countries associated with that geography.
3. The requester may select from a list of countries to identify that the candidate may be located within one of several countries.

Therefore, by using the "offshore" option, a requester may ensure that the skill may be performed anywhere in the world.

In step 44, the requester will enter any additional information required for the request. For example, the requester may want to identify any citizenship preferences for candidates or potential expenses (known travel expenses, additional software required, etc.) with respect to candidates. In step 46, the requester is presented with a list of associated suppliers that the service request document may be routed to. In response, the requester selects suppliers from the list. The supplier list is generated based on a supplier configuration (supplier configuration data 17 of FIG. 1). Supplier configuration may comprise country, company, line of business, work region, and service type. Just as the work location is set up with "ALLxxx," (i.e., where "xxx" is identified above in step 43), a corresponding work region of "ALLxxx" can be used to configure suppliers to be used across all regions in a country, in a geography, or world-wide. Thus, the list of suppliers available for offshore requests is different from those for an onsite request. In step 50, a service request document comprising the selected skill is generated and transmitted to the suppliers selected in step 46. In step 52 it is determined if the selected work location is within the selected geographical area.

If in step 52, it is determined that the selected work location is within the selected geographical area then in step 45, the suppliers will transmit lists of candidates from within the geographical area.

If in step 52, it is determined that the selected work location is not within the selected geographical area then in step 53, the suppliers will transmit lists of candidates which include descriptions of candidates, description of their qualifications relative to the level requested, any secondary skills they possess which should be taken into consideration along with their resume. For each candidate, the supplier will indicate where the person will be located (country, state/region, and city). Additionally, the supplier identifies a wage and/or bill rate for a candidate using pre-negotiated rate matrix parameters dependent upon various configurations (based on the country, line of business, service type, etc.). The pre-negotiated rate will vary by candidate offered based on their individual work location. For each candidate, a different currency may be entered to either coincide with the home country of the contractor candidate or with any other currency. The supplier responses will be normalized to a common currency for comparison purposes. The supplier may also identify a candidate's citizenship, and any visa requirements, if travel is required. Additionally, the requester is notified via an email that a candidate(s) has been submitted. In step 54, the requester will select a candidate and the process terminates in step 56.

Figure 3:
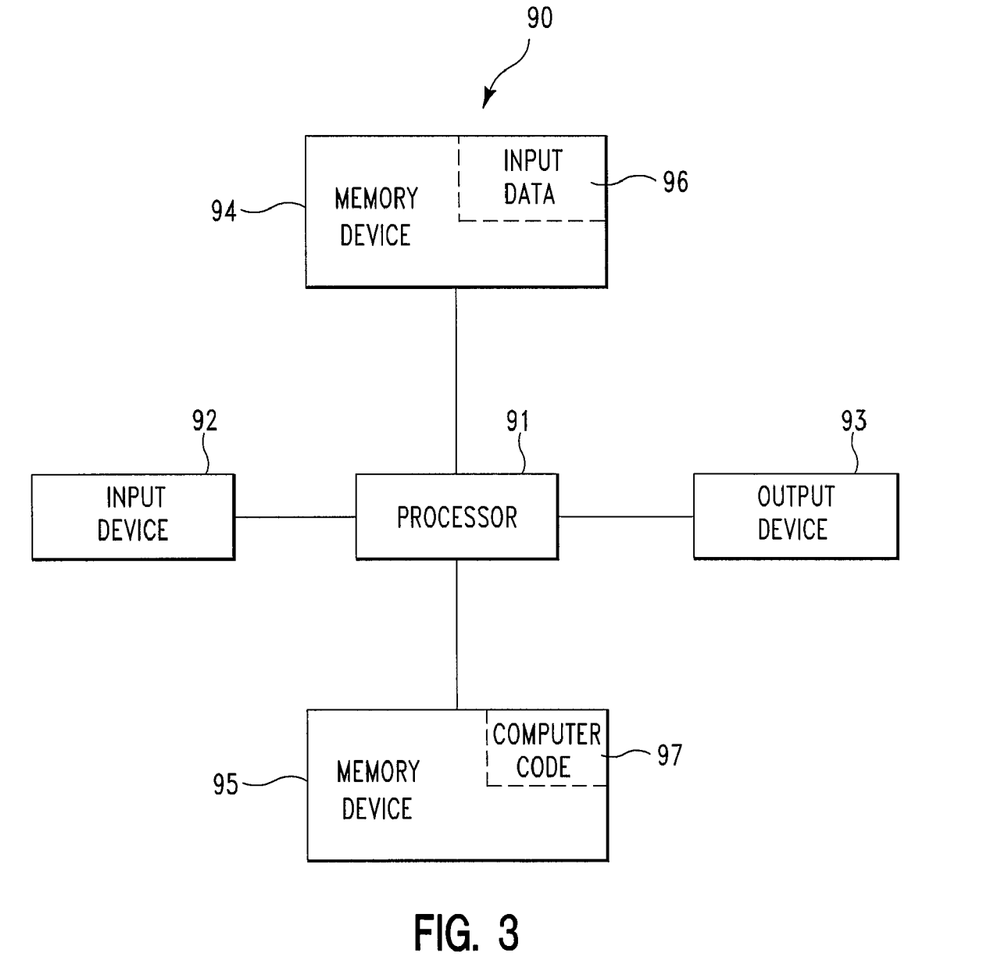
FIG. 3 illustrates a computer apparatus used for generating a global resource candidate request, in accordance with embodiments of the present invention.

FIG. 3 illustrates a computer apparatus 90 (i.e., computing apparatus 5*a* and 5*b* in FIG. 1) used for generating a global resource candidate request, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for generating a global resource candidate request. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to generate a global resource candidate request. Thus the present invention discloses a process for deploying, integrating, creating, hosting, or maintaining computing infrastructure, comprising integrating computer-readable code into the computer system 90, wherein the code in combination with the computer system 90 is capable of performing a method for generating a global resource candidate request. In another embodiment, the invention provides a business method that performs the process steps of the invention on a subscription, advertising, and/or fee basis. That is, a service provider, such as a Solution Integrator, could offer to generate a global resource candidate request. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A global resource method comprising:

receiving, by a computing system from a requester, a command for creating a candidate request, said computing system comprising a memory device, said memory device comprising a list of skills, a list of suppliers, a list of geographical areas, supplier configuration data, and a list of work locations;

receiving, by said computing system from said requester, a command indicating that a candidate may be selected from any location in the world;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

receiving, by said computing system from said requester, a language request indicating that any candidates associated with said first skill are able to speak a first specific language and a second specific language differing from said first specific language;

receiving, by said computing system from said requester, time period data indicating a specified time period associated with performing said first skill;

receiving, by said computing system from said requester, a time zone request indicating that any candidates associated with said first skill are associated with a specified time zone;

presenting, by said computing system for said requester, a first group of suppliers of said list of suppliers, said first group of suppliers associated with said supplier configuration data, said language request, said time period data, and time zone request;

receiving, by said computing system from said requester, data indicating a first specified country for selecting suppliers, said first specified country associated with said first specific language;

receiving, by said computing system from said requester, a selection of a second group of suppliers of said first group of suppliers, said second group comprising a comprising a first supplier associated with said geographical area specification data and said first specified country;

receiving, by said computing system from said requester, candidates rates data comprising candidate rates associated with different currency types associated with different countries;

receiving, by said computing system from said requester, data indicating a second specified country for selecting candidates associated with said first skill, said second specified country different from said first specified country, said second specified country associated with said second specific language and said requestor;

generating, by a computer processor of said computing system, a service request document, said service request document comprising said selection of said first skill, said candidates rates data, and said second specified country;

transmitting, by said computing system, said service request document to said second group of suppliers; and receiving, by said computing system from said first supplier in response to said service request document, a list of candidates, said list of candidates comprising candidates associated with said first skill and said candidate rates data associated each of said candidates, said candidate rates data normalized to a common currency for specified countries with respect to all areas associated with said geographical area specification data.

2. The method of claim 1, further comprising:

receiving, by said computing system from said first supplier, an email specifying that said list of candidates has been transmitted.

3. The method of claim 1, wherein said geographical area specification data specifies that said first skill will be performed within said first geographical area, wherein said first work location is located within said first geographical area, and wherein said first group of suppliers is associated with said first geographical area.

4. The method of claim 3, wherein said first geographical area comprises a first country.

5. The method of claim 3, wherein each supplier of said first group of suppliers is located with said first geographical area.

6. The method of claim 1, wherein said geographical area specification data specifies that said first skill will be performed within a second geographical area of said list of geographical areas, wherein said second geographical area is located external to said first geographical area, wherein said first work location is located within said second geographical area, and wherein said first group of suppliers is associated with said geographical area.

7. The method of claim 6, wherein said first geographical area comprises a first country, wherein said second geographical area comprises a second country that is a different country as said first country.

8. The method of claim 6, wherein each supplier of said first group of suppliers is located with said second geographical area.

9. The method of claim 6, wherein a first group candidates of said list of candidates reside within said first geographical area, and wherein a second group candidates of said list of candidates reside within said second geographical area.

10. The method of claim 9, wherein a third group candidates of said list of candidates reside within a third geographical area of said list of geographical areas, and wherein said third geographical area is located external to said first geographical area and said second geographical area.

11. A computing system comprising a computer processor coupled to a computer-readable memory unit, said memory unit comprising instructions that when executed by the processor implement a global resource method, said method comprising:

receiving, by said computing system from a requester, a command for creating a candidate request, said memory unit comprising a list of skills, a list of suppliers, a list of geographical areas, supplier configuration data, and a list of work locations;

receiving, by said computing system from said requester, a command indicating that a candidate may be selected from any location in the world;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

receiving, by said computing system from said requester, a language request indicating that any candidates associated with said first skill are able to speak a first specific language and a second specified language differing from said first specific language;

receiving, by said computing system from said requester, time period data indicating a specified time period associated with performing said first skill;

receiving, by said computing system from said requester, a time zone request indicating that any candidates associated with said first skill are associated with a specified time zone;

presenting, by said computing system for said requester, a first group of suppliers of said list of suppliers, said first group of suppliers associated with said supplier configuration data, said language request, said time period data, and time zone request;

receiving, by said computing system from said requester, data indicating a first specified country for selecting suppliers, said first specified country associated with said first specific language;

receiving, by said computing system from said requester, a selection of a second group of suppliers of said first group of suppliers, said second group comprising a comprising a first supplier associated with said geographical area specification data and said first specified country;

receiving, by said computing system from said requester, candidates rates data comprising candidate rates associated with different currency types associated with different countries;

receiving, by said computing system from said requester, data indicating a second specified country for selecting candidates associated with said first skill, said second specified country different from said first specified country, said second specified country associated with said second specific language and said requestor;

generating, by said computer processor of said computing system, a service request document, said service request document comprising said selection of said first skill, said candidates rates data, and said second specified country;

transmitting, by said computing system, said service request document to said second group of suppliers; and receiving, by said computing system from said first supplier in response to said service request document, a list of candidates, said list of candidates comprising candidates associated with said first skill and said candidate rates data associated each of said candidates, said candidate rates data normalized to a common currency for specified countries with respect to all areas associated with said geographical area specification data.

12. The computing system of claim 11, wherein said method further comprises:

receiving, by said computing system from said first supplier, an email specifying that said list of candidates has been transmitted.

13. The computing system of claim 11, wherein said geographical area specification data specifies that said first skill will be performed within said first geographical area, wherein said first work location is located within said first geographical area, and wherein said first group of suppliers is associated with said first geographical area.

14. The computing system of claim 13, wherein said first geographical area comprises a first country.

15. The computing system of claim 13, wherein each supplier of said first group of suppliers is located with said first geographical area.

16. The computing system of claim 11, wherein said geographical area specification data specifies that said first skill will be performed within a second geographical area of said list of geographical areas, wherein said second geographical area is located external to said first geographical area, wherein said first work location is located within said second geographical area, and wherein said first group of suppliers is associated with said geographical area.

17. The computing system of claim 16, wherein said first geographical area comprises a first country, wherein said second geographical area comprises a second country that is a different country as said first country.

18. The computing system of claim 16, wherein each supplier of said first group of suppliers is located with said second geographical area.

19. The computing system of claim 16, wherein a first group candidates of said list of candidates reside within said first geographical area, and wherein a second group candidates of said list of candidates reside within said second geographical area.

20. The computing system of claim 19, wherein a third group candidates of said list of candidates reside within a third geographical area of said list of geographical areas, and wherein said third geographical area is located external to said first geographical area and said second geographical area.

21. A process for supporting computer infrastructure, said process comprising providing at least one support service for at least one of creating, integrating, hosting, maintaining, and deploying computer-readable code in a computing system comprising a computer processor, wherein the code in combination with the computing system is capable of performing a global resource method, said method comprising:

receiving, by said computing system from a requester, a command for creating a candidate request, said computing system comprising a memory unit, said memory unit comprising a list of skills, a list of suppliers, a list of geographical areas, supplier configuration data, and a list of work locations;

receiving, by said computing system from said requester, a command indicating that a candidate may be selected from any location in the world;

associating, by said computing system, groups of suppliers from said list of suppliers with each geographical area of said list of geographical areas;

receiving, by said computing system from said requester, a selection of a first skill of said list of skills;

determining, by said computing system, that a first geographical area of said list of geographical areas is configured for global resource processing, said requester located within said first geographical area;

receiving, by said computing system from said requester, geographical area specification data associated with said first skill;

receiving, by said computing system from said requester, a selection of a first work location of said list of work locations, said first work location associated with said first skill;

receiving, by said computing system from said requester, a language request indicating that any candidates associated with said first skill are able to speak a first specific language and a second specific language differing from said first specific language;

receiving, by said computing system from said requester, time period data indicating a specified time period associated with performing said first skill;

receiving, by said computing system from said requester, a time zone request indicating that any candidates associated with said first skill are associated with a specified time zone;

presenting, by said computing system for said requester, a first group of suppliers of said list of suppliers, said first group of suppliers associated with said supplier configuration data, said language request, said time period data, and time zone request;

receiving, by said computing system from said requester, data indicating a first specified country for selecting suppliers, said first specified country associated with said first specific language;

receiving, by said computing system from said requester, a selection of a second group of suppliers of said first group of suppliers, said second group comprising a comprising a first supplier associated with said geographical area specification data and said first specified country;

receiving, by said computing system from said requester, candidates rates data comprising candidate rates associated with different currency types associated with different countries;

receiving, by said computing system from said requester, data indicating a second specified country for selecting candidates associated with said first skill, said second specified country different from said first specified country, said second specified country associated with said second specific language and said requestor;

generating, by said computer processor of said computing system, a service request document, said service request document comprising said selection of said first skill, said candidates rates data, and said second specified country;

transmitting, by said computing system, said service request document to said second group of suppliers; and receiving, by said computing system from said first supplier in response to said service request document, a list of candidates, said list of candidates comprising candidates associated with said first skill and said candidate rates data associated each of said candidates, said candidate rates data normalized to a common currency for specified countries with respect to all areas associated with said geographical area specification data.

22. The process of claim 21, wherein said method further comprises:

receiving, by said computing system from said first supplier, an email specifying that said list of candidates has been transmitted.

23. The process of claim 21, wherein said geographical area specification data specifies that said first skill will be performed within said first geographical area, wherein said first work location is located within said first geographical area, and wherein said first group of suppliers is associated with said first geographical area.

24. The process of claim 23, wherein said first geographical area comprises a first country.

25. The process of claim 23, wherein each supplier of said first group of suppliers is located with said first geographical area.

26. The process of claim 21, wherein said geographical area specification data specifies that said first skill will be performed within a second geographical area of said list of geographical areas, wherein said second geographical area is located external to said first geographical area, wherein said first work location is located within said second geographical area, and wherein said first group of suppliers is associated with said geographical area.

27. The process of claim 26, wherein said first geographical area comprises a first country, wherein said second geographical area comprises a second country that is a different country as said first country.

28. The process of claim 26, wherein each supplier of said first group of suppliers is located with said second geographical area.

29. The process of claim 26, wherein a first group candidates of said list of candidates reside within said first geographical area, and wherein a second group candidates of said list of candidates reside within said second geographical area.

30. The process of claim 29, wherein a third group candidates of said list of candidates reside within a third geographical area of said list of geographical areas, and wherein said third geographical area is located external to said first geographical area and said second geographical area.

31. A computer program product, comprising a computer readable storage medium comprising a computer readable program code embodied therein, said computer readable program code adapted to implement a global resource method within a computing system comprising a computer processor, said method comprising:
  receiving, by said computing system from a requester, a command for creating a candidate request, said computer usable medium comprising a list of skills, a list of suppliers, a list of geographical areas, supplier configuration data, and a list of work locations;
  receiving, by said computing system from said requester, a command indicating that a candidate may be selected from any location in the world;
  associating, by said computing system, groups of suppliers from said list of suppliers with each geographical area of said list of geographical areas;
  receiving, by said computing system from said requester, a selection of a first skill of said list of skills;
  determining, by said computing system, that a first geographical area of said list of geographical areas is configured for global resource processing, said requester located within said first geographical area;
  receiving, by said computing system from said requester, geographical area specification data associated with said first skill;
  receiving, by said computing system from said requester, a selection of a first work location of said list of work locations, said first work location associated with said first skill;
  receiving, by said computing system from said requester, a language request indicating that any candidates associated with said first skill are able to speak a first specific language and a second specified language differing from said first specific language;
  receiving, by said computing system from said requester, time period data indicating a specified time period associated with performing said first skill;
  receiving, by said computing system from said requester, a time zone request indicating that any candidates associated with said first skill are associated with a specified time zone;
  presenting, by said computing system for said requester, a first group of suppliers of said list of suppliers, said first group of suppliers associated with said supplier configuration data, said language request, said time period data, and time zone request;
  receiving, by said computing system from said requester, data indicating a first specified country for selecting suppliers, said first specified country associated with said first specific language;
  receiving, by said computing system from said requester, a selection of a second group of suppliers of said first group of suppliers, said second group comprising a comprising a first supplier associated with said geographical area specification data and said first specified country;
  receiving, by said computing system from said requester, candidates rates data comprising candidate rates associated with different currency types associated with different countries;
  receiving, by said computing system from said requester, data indicating a second specified country for selecting candidates associated with said first skill, said second specified country different from said first specified country, said second specified country associated with said second specific language and said requestor;
  generating, by said computer processor of said computing system, a service request document, said service request document comprising said selection of said first skill, said candidates rates data, and said second specified country;
  transmitting, by said computing system, said service request document to said second group of suppliers; and
  receiving, by said computing system from said first supplier in response to said service request document, a list of candidates, said list of candidates comprising candidates associated with said first skill and said candidate rates data associated each of said candidates, said candidate rates data normalized to a common currency for specified countries with respect to all areas associated with said geographical area specification data.

32. The computer program product of claim 31, wherein said method further comprises:
  receiving, by said computing system from said first supplier, an email specifying that said list of candidates has been transmitted.

33. The computer program product of claim 31, wherein said geographical area specification data specifies that said first skill will be performed within said first geographical area, wherein said first work location is located within said first geographical area, and wherein said first group of suppliers is associated with said first geographical area.

34. The computer program product of claim 33, wherein said first geographical area comprises a first country.

35. The computer program product of claim 33, wherein each supplier of said first group of suppliers is located with said first geographical area.

36. The computer program product of claim 31, wherein said geographical area specification data specifies that said first skill will be performed within a second geographical area of said list of geographical areas, wherein said second geographical area is located external to said first geographical area, wherein said first work location is located within said second geographical area, and wherein said first group of suppliers is associated with said geographical area.

37. The computer program product of claim 36, wherein said first geographical area comprises a first country, wherein said second geographical area comprises a second country that is a different country as said first country.

38. The computer program product of claim 36, wherein each supplier of said first group of suppliers is located with said second geographical area.

39. The computer program product of claim 36, wherein a first group candidates of said list of candidates reside within said first geographical area, and wherein a second group candidates of said list of candidates reside within said second geographical area.

40. The computer program product of claim 39, wherein a third group candidates of said list of candidates reside within a third geographical area of said list of geographical areas, and wherein said third geographical area is located external to said first geographical area and said second geographical area.

* * * * *